(12) United States Patent
Cohen et al.

(10) Patent No.: US 11,695,896 B2
(45) Date of Patent: *Jul. 4, 2023

(54) SYNTHETICALLY ENLARGED CAMERA APERTURE

(71) Applicant: Corephotonics Ltd., Tel-Aviv (IL)

(72) Inventors: Noy Cohen, Tel-Aviv (IL); Gal Shabtay, Tel-Aviv (IL); Ephraim Goldenberg, Ashdod (IL); Gil Bachar, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 173 days.

This patent is subject to a terminal disclaimer.

(21) Appl. No.: 17/165,324

(22) Filed: Feb. 2, 2021

(65) Prior Publication Data

US 2021/0168037 A1 Jun. 3, 2021
US 2023/0171368 A9 Jun. 1, 2023

Related U.S. Application Data

(63) Continuation of application No. 16/121,049, filed on Sep. 4, 2018, now Pat. No. 10,951,834.

(Continued)

(51) Int. Cl.
*H04N 5/262* (2006.01)
*H04L 41/0816* (2022.01)
(Continued)

(52) U.S. Cl.
CPC ....... *H04N 5/2621* (2013.01); *H04L 41/0816* (2013.01); *H04L 41/12* (2013.01); *H04N 23/687* (2023.01); *H04N 23/75* (2023.01)

(58) Field of Classification Search
None
See application file for complete search history.

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7 μm Pixels in 0.11 μm CMOS, Fife et al., Stanford University, 2008, 3 pages.
Dual camera intelligent sensor for high definition 360 degrees surveillance, Scotti et al., Publisher: IET, May 9, 2000, 8 pages.

(Continued)

*Primary Examiner* — Willie J Daniel, Jr.
(74) *Attorney, Agent, or Firm* — Menachem Nathan; Nathan & Associates (57) ABSTRACT

Methods for obtaining a shallow depth of field effect (DOF) and improved signal-to-noise (SNR) in an image through synthetically increase the camera aperture of a compact camera using at least one actuator included in such a camera for other known purposes, for example for providing optical image stabilization (OIS). The synthetically enlarged camera aperture enables to take a plurality of images at different aperture positions. The plurality of images is processed into an image with shallow DOF and improved SNR.

18 Claims, 3 Drawing Sheets

Related U.S. Application Data (60) Provisional application No. 62/567,287, filed on Oct. 3, 2017.

(51) Int. Cl.
 *H04L 41/12* (2022.01)
 *H04N 23/75* (2023.01)
 *H04N 23/68* (2023.01)

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,951,834 B2 * | 3/2021 | Cohen .............. H04L 41/12 |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |

(56) References Cited

U.S. PATENT DOCUMENTS

| | | |
|---|---|---|
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryyñanen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2020/0103726 A1* | 4/2020 | Shabtay ............ H04N 5/23293 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |

(56) References Cited

FOREIGN PATENT DOCUMENTS

| | | |
|---|---|---|
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

* cited by examiner

SYNTHETICALLY ENLARGED CAMERA APERTURE

CROSS REFERENCE TO RELATED APPLICATIONS

This is a continuation application from U.S. patent application Ser. No. 16/121,049 filed Sep. 4, 2018 (now allowed), and is related to and claims the benefit of U.S. Provisional patent application 62/567,287 filed Oct. 3, 2017, which is incorporated herein by reference in its entirety.

FIELD

Embodiments disclosed herein relate in general to digital cameras, and in particular to miniature folded and non-folded digital cameras.

BACKGROUND

Compact cameras, such as those that are incorporated in smartphones, have typically small apertures with a size of a few millimeters (mm) (e.g. 1-5 mm). The relatively small zo aperture of the camera (compared with cameras with larger aperture) causes at least the following handicaps:

a) the amount of light that can be absorbed by the camera image sensor in a given period of time is limited. This results in poor signal to noise ratio (SNR) ratio when capturing an image in low light situations; and b) the small aperture, when coupled with a relatively short focal length (e.g. 3-15 mm) due to the physical dimensions of the camera, causes a relatively wide depth of field (DOF). This is contrary to the shallow DOF or "bokeh" effect that is a sought-after property in smartphone devices. Note that "shallow DOF" and "bokeh" are used herein interchangeably.

In known art, the bokeh effect is achieved with a dual-camera setup, by calculating a depth map from two camera images obtained from two separate cameras and by digitally blurring the images according to the depth map.

Compact cameras in smartphones and other hand-held personal electronic devices have different types of actuators. In an example, they often have an optical image stabilization (OIS) actuator that can move the lens barrel (or simply the "lens") of the camera in a plane parallel to the image sensor plane. In folded cameras, in which an optical path from an object to be photographed is folded toward the image sensor by an optical path folding element (OPFE), for example a prism, OIS is known to be achieved by shifting the lens barrel laterally, in parallel to the sensor plane, or by tilting the prism (see for example co-owned published international patent application WO2016166730).

SUMMARY

In the contexts of the following disclosure, DOF is defined as the distance (in meters, cm, etc.) around the plane of focus (POF) in which objects appear acceptably sharp in an image. A shallow DOF is such that the distance is small (e.g. less than 20% of the object distance from the camera) and a wide DOF is such that the distance is large (e.g. more than 30% of the object distance from the camera).

In various exemplary embodiments, there are provided methods for synthetically enlarging a camera aperture and for obtaining shallow DOF effects in folded and non-folded (also referred to as "upright", "straight", standing" or "vertical") compact cameras using dedicated and/or existing actuators, and in particular OIS actuators included in such cameras. The miniature cameras for example in camera incorporated in smartphones, tablet computers, laptop computer, smart televisions, smart home assistant devices, drones, baby monitors, video conference rooms, surveillance cameras, cars, robots and other personalized electronic devices. Known OIS actuators, for example similar to those disclosed in co-owned published international patent application WO2016166730 (folded case) and see for example co-owned international patent application WO20160156996 (non-folded case), may be "modified" by increasing the size and/or length of their magnets and/or coils and/or rails to enable longer movement range (e.g. up to about ±2 mm) of elements in folded and non-folded compact cameras. Henceforth, such OIS actuators will be referred to as "modified OIS actuators".

The following description refers to relative movements of one camera element (for example the lens, prism, or both) vs. another camera element (for example the image sensor) in an exemplary orthogonal XYZ coordinate system. The exemplary coordinate system is for reference and for understanding inventive features disclosed herein, and should not be considered limiting.

The new use of dedicated and/or existing camera actuators in general and OIS actuators (regular or modified) in particular, coupled with an image acquisition system and a post-processing algorithm, can synthetically increase the size of the aperture, providing better signal-to-noise ratio (SNR) and a shallower DOF. The term "synthetically increasing" or "synthetically enlarging" as applied herein to a camera aperture refers to the camera aperture size being effectively (but not physically) increased by capturing different (e.g. a plurality N of) images with the aperture in (N) different positions. The camera aperture is shifted laterally relative to the sensor by a significant amount (for example by a few mm) and several images are captured, each with the aperture located in a different position relative to the sensor. To clarify, the physical aperture size remains constant. Then, by aligning all captured images with respect to a certain in-focus object at a certain distance from the camera and by averaging them, objects outside the plane of focus will blur due to the parallax effect, thereby providing a shallow DOF effect. In some embodiments, the modifications to the OIS actuators to obtain modified OIS actuators enable large enough movement of the aperture of the optical system relative to the original position, so that the resulting parallax effect will be significant, i.e. shallower DOF by 10%, 20% or even 50% from the DOF of a single frame.

In exemplary embodiments there is provided a method comprising providing a camera that includes a camera aperture, a lens having a lens optical axis, an image sensor and an actuator, and operating the at least one actuator to synthetically enlarge the camera aperture to obtain a shallow DOF effect and improved SNR in an image formed from a plurality of images obtained with the image sensor.

In some exemplary embodiments, the actuator is an OIS actuator.

In some exemplary embodiments, the actuator is a modified OIS actuator with an extended actuation range. The extended actuation range may be a range of up to ±2 mm, and more specifically between ±1-2 mm.

In an exemplary embodiment, the operating the actuator to synthetically enlarge the camera aperture includes operating the actuator to move the camera aperture to a plurality of positions, wherein each of the plurality of images is obtained in a respective camera aperture position.

In an exemplary embodiment, the operating the actuator to synthetically enlarge the camera aperture includes operating the actuator to move the lens relative to the image sensor in a first direction substantially perpendicular to the lens optical axis.

In an exemplary embodiment, the operating the actuator to synthetically enlarge the camera aperture includes operating the actuator to move the lens relative to the image sensor in a second direction substantially perpendicular to the lens optical axis, wherein the second direction is not parallel to the first direction.

In some exemplary embodiments, the first and second directions are orthogonal to each other.

In some exemplary embodiments, the camera is a non-folded camera.

In some exemplary embodiments, the camera is a folded camera.

In an exemplary embodiment, the camera is a folded camera that further includes an optical path folding element (OPFE) that folds light from a first optical axis to the lens optical axis.

In an exemplary embodiment in which the camera is folded the operating the actuator to synthetically enlarge the camera aperture includes operating the actuator to move the camera aperture to a plurality of positions, wherein each of the plurality of images is obtained in a respective camera aperture position.

In an exemplary embodiment in which the camera is folded, the operating the actuator to synthetically enlarge the camera aperture includes operating the actuator to move the lens relative to the image sensor in a first direction substantially perpendicular to the lens optical axis.

In an exemplary embodiment in which the camera is folded, the operating the actuator to synthetically enlarge the camera aperture includes operating the actuator to move the lens relative to the image sensor in a second direction substantially perpendicular to the lens optical axis, wherein the second direction is not parallel to the first direction.

BRIEF DESCRIPTION OF THE DRAWINGS

Aspects, embodiments and features disclosed herein will become apparent from the following detailed description when considered in conjunction with the accompanying drawings, in which.

DETAILED DESCRIPTION

Figure 1A:
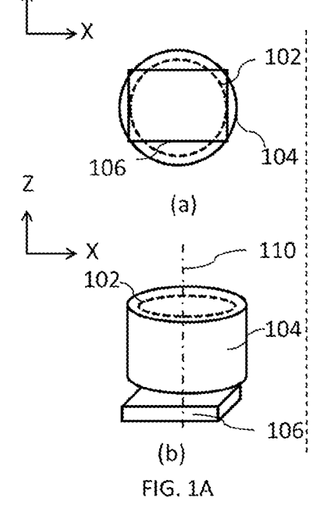
FIG. 1A shows an aperture and lens barrel centered relative to an image sensor in a non-folded camera in (a) top view and (b) side view.
Figure 1B:
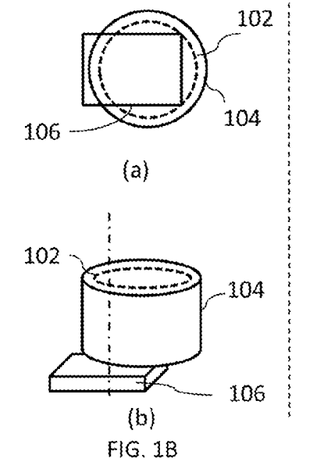
FIG. 1B shows the aperture and lens barrel of FIG. 1A after a lateral shift in a first direction relative to the image sensor in (a) top view and (b) side view.
Figure 1C:
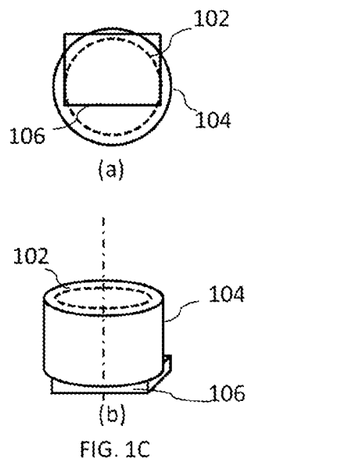
FIG. 1C shows the aperture and lens barrel of FIG. 1A after a lateral shift in a second direction orthogonal to the first direction relative to the image sensor in (a) top view and (b) side view.

FIGS. 1A-C show an exemplary embodiment of a camera 100 exhibiting a synthetically enlarged camera aperture disclosed herein. Camera 100 can be exemplary an upright camera. Camera 100 comprises a lens 104 and an image sensor 106. Camera 100 may further comprise other elements which are not shown for simplicity and are known in the art, such as: protective shield, infra-red (IR) filter, focusing mechanism (e.g. actuator), electrical connectivity, etc. Lens 104 may be for example a fixed-focal-length-lens, characterized by an effective-focal-length (EFL), and an aperture 102. Aperture 102 defines the aperture of camera 100, and the two terms (camera aperture and lens aperture) are used herein interchangeably. The ratio between the EFL and the lens aperture diameter is known as the camera or lens "f-number". For example, the EFL of lens 104 may be in the range of 3-15 mm. For example, the diameter of aperture 102 may be in the range of 1-6 mm. For example, the f-number of lens may be in the range of 1.2-3.2. However, all these exemplary numbers (EFL, aperture diameter, f-numbers) are not limiting. Camera 100 also comprises a first actuator, which is not shown in the figures. The first actuator may move (shift, actuate) lens 104 and aperture 102 with respect to image sensor 106 in the X-Y plane (parallel to the image sensor plane). Camera 100 may also include a second actuator (not shown) which may move (shift, actuate) lens 104 in the Z direction with respect to image sensor 106 for focusing purposes. In an example embodiment, the first actuator used for moving the lens may shift the lens in the X-Y plane, with a moving range on the order of ±2 mm along each axis. The first and/or second actuators may be similar in structure to actuators used in a non-folded compact camera for OIS but with a significantly increased range, from (typically) a few hundreds of microns to an order of +/−2 mm along each axis. In some embodiments, the first and/or second actuator may be not similar to an OIS actuator. The following non-limiting description gives an example with the use of modified OIS actuators, with the underling understanding that other methods of actuations may be used. The significantly increased movement range may be achieved by using current and known OIS technology (for example ball-bearing voice coil motor (VCM) technology), with larger magnets and coils and with longer rails, which allows a larger range of movement (e.g. in a range ±1-2 mm range of movement). Other actuation methods may also be applied, providing the lens can be shifted with the specified range with respect to the sensor (e.g. stepper motors, piezoelectric motors, shape memory alloy (SMA) actuators, etc.).

Returning now to FIGS. 1A-C, each figure shows the lens and lens aperture position vs. the image sensor from, respectively, a top view (a) and a schematic side view or 3D rendering (b). FIG. 1A shows upright camera 100 with aperture 102 and lens 104 centered vs. image sensor 106 in an "original position". FIGS. 1B and 1C show camera 100 with aperture 102 and lens 104 shifted respectively in (a) in a first direction (+X) and in (b) in a second direction (−Y) relative to image sensor 106 (i.e. shifted in two orthogonal directions vs. an optical axis 110 parallel to the Z direction, along which light enters the lens toward image sensor 106). The shift of the lens from its original position in FIGS. 1B and 1C can be in the range of a few mm, for example 2 mm. The two positions in FIGS. 1B and 1C are only an example, and other shift directions and positions are also possible in the X-Y plane, for example −X shift, +Y shift and a shift in a combined X and Y directions. In particular, note that while shift directions described herein are orthogonal to each other, in some embodiments shifts may occur in directions that are not orthogonal to other shift directions.

Figure 2A:
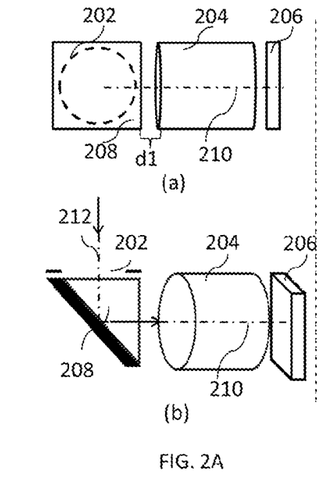
FIG. 2A shows an exemplary embodiment of a folded camera disclosed herein in (a) top view and (b) side view.
Figure 2B:
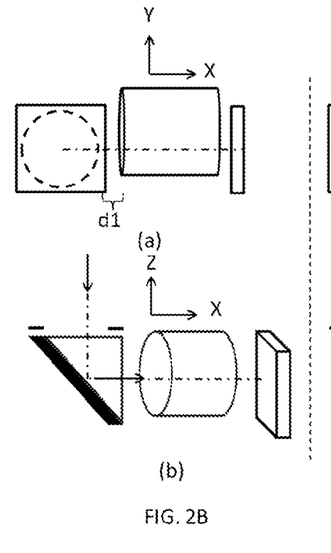
FIG. 2B shows the aperture, prism and lens barrel of the camera of FIG. 2A after a lateral shift of the lens in a first direction relative to the image sensor in (a) top view and (b) side view.
Figure 2C:
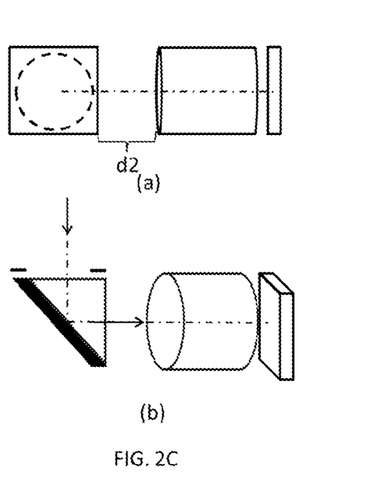
FIG. 2C shows the aperture, prism and lens barrel of the camera of FIG. 2A after a shift of the prism in a second direction orthogonal to the first direction relative to the image sensor in (a) top view and (b) side view.
Figure 2D:
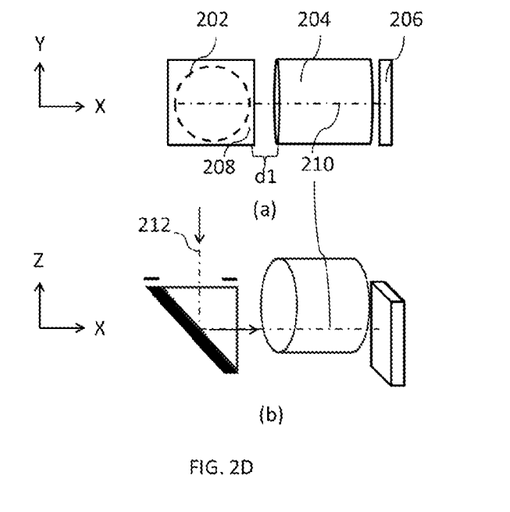
FIG. 2D shows the aperture, prism and the lens barrel of the camera of FIG. 2A after a shift of the lens in a second direction orthogonal to the first direction relative to the image sensor in (a) top view and (b) side view.

FIGS. 2A-D show an exemplary embodiment of a folded camera 200 exhibiting a synthetically enlarged camera aperture disclosed herein. Each figure shows the aperture and lens position vs. the image sensor from, respectively, a top view (a) and a schematic side view or 3D rendering (b). Camera 200 includes a camera aperture 202, a lens 204, an image sensor 206 and an OPFE (for example a prism) 208. Like camera 100, camera 200 may include other elements not shown, for simplicity, and are known in the art. FIG. 2A shows the "original position" of camera aperture 202, centered on a first optical axis 210. In the folded camera, light entering the lens along first optical axis 210 is folded to continue along a second optical axis 212 toward image sensor 206. FIG. 2B shows lens 204 shifted relative to image sensor 206 in a first (e.g. +Y) direction. FIG. 2C shows camera aperture 202 and prism 208 shifted relative to lens 204 in a second direction (e.g. −X) which is orthogonal to the first direction. FIG. 2D shows lens 204 shifted relative to image sensor 206 in a third direction (e.g. +Z). The motion direction shown in FIG. 2B-2D are only an example, and other shift direction may exist, in particular any linear combination of the shift directions shown.

In FIG. 2B, the lens is moved in a direction similar to that in FIG. 1B. In FIG. 2C, the lens is stationary, but the prism moves to create the same optical affect as in FIG. 1C. In FIG. 2D, the lens moves in a third direction, resulting in an optical effect similar to that in FIG. 2C.

An actuator (not shown) as disclosed in co-owned published international patent applications WO2016166730 (folded) and WO20160156996 (non-folded), may be modified to increase the movement (range) of the lens barrel from a few hundreds of microns to a movement on the order of ±2 mm, to enable shifting the aperture and/or lens along a first direction. The prism may be moved in a second direction, to bring it closer or further away from the edge of the lens, thus also shifting the camera aperture. In other words, in the exemplary coordinate systems shown in FIGS. 1 and 2, a "longer range" modified OIS actuator can shift the lens and camera aperture by up to about ±2 mm in the X-Y directions in a non-folded camera, and by up to about ±2 mm in the X-Y directions or in Y-Z directions in a folded camera. The prism can be moved for example using the same technology that is used to move the lens, but in a range that positions the prism closer/farther from the edge of the lens.

Figure 4:
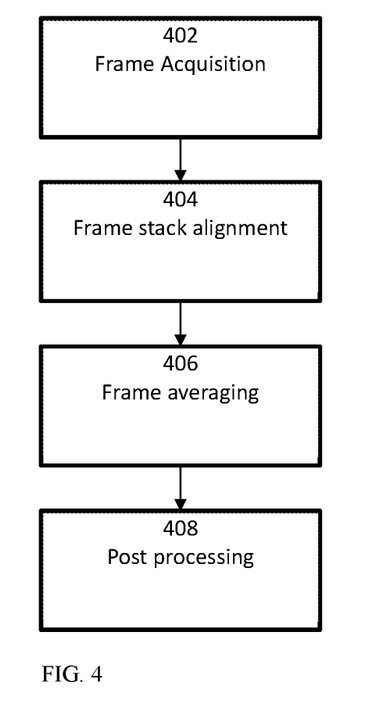
FIG. 4 shows in a flow chart stages of an exemplary method that uses a synthetically increased camera aperture to obtain a shallow DOF and improved SNR.

An exemplary method that uses a synthetically increased camera aperture to obtain a shallow DOF and improved SNR is provided with reference to FIG. 4. The exemplary method can be performed, for example, with a camera similar to camera 100 or camera 200:

Acquisition stage (FIG. 4, step 402): a plurality N of images of the same scene is acquired in rapid succession (for example in 10-50 ms per image, to prevent a significant object movement during the acquisition process) when moving the position of the aperture between images, so that each image is captured when the aperture is at a different position. In an example of an exposure rate of 10-60 ms, N would typically be in the range of 3-9 frames. In an example of high illumination conditions, a high frame rate may be obtained such that N may be on the order of a few tens or even a few hundreds of frames.

Figure 3A:
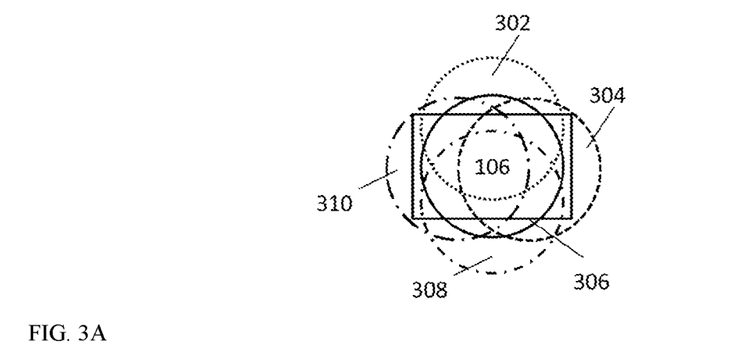
FIG. 3A shows schematically an example of 5 possible positions of the camera aperture relative to the image sensor, corresponding to 5 different frames captured by camera of FIGS. 1 and/or 2
Figure 3B:
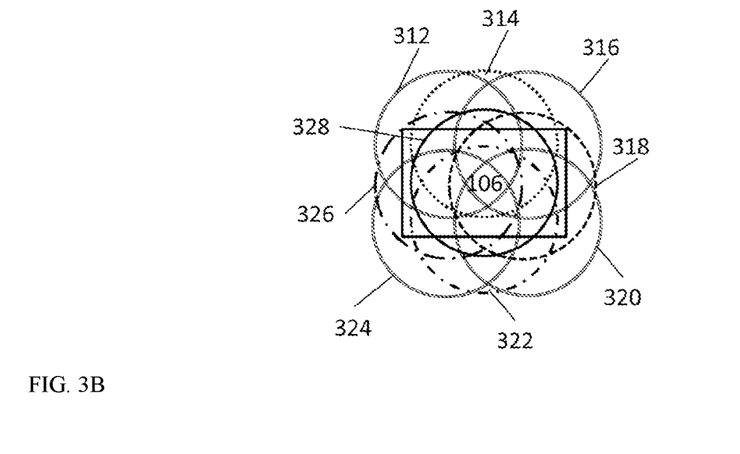
FIG. 3B shows schematically an example of nine possible positions of the camera aperture relative to the image sensor, corresponding to nine different frames captured by a camera of FIGS. 1 and/or 2.
Figure 3C:
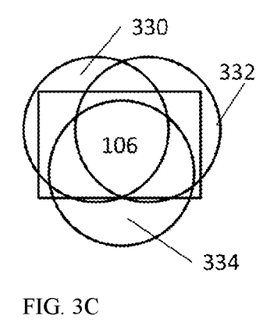
FIG. 3C shows schematically an example of three possible positions of the camera aperture relative to the image sensor, corresponding to three different frames captured by a camera of FIGS. 1 and/or 2.

FIG. 3A shows schematically an example of N=5 possible positions 302-310 of the aperture relative to image sensor 106, corresponding to N=5 different frames captured by the camera (e.g. camera 100 or 200). In other examples, N may differ from 5. FIG. 3B shows schematically an example of N=9 possible positions 312-328 of the aperture relative to image sensor 106, corresponding to N=9 different frames captured by the camera (e.g. camera 100 or 200). FIG. 3C shows schematically an example of N=3 possible positions 330-334 of the aperture relative to image sensor 106, corresponding to N=3 different frames captured by the camera (e.g. camera 100 or 200).

In an embodiment, the first or second actuator may be a closed loop actuator, such that a position indication and a settling (i.e. arrival of the actuator to the target position) indication may be provided to the camera. In an embodiment, the exposure of the camera maybe synchronized with the motion of the actuator, such that the sequence of N frames acquisition may be constructed from a repetitive stage of (1) frame exposure, (2) actuator motion to a new position, (3) actuator settling. Actuator settling may be such that the actuator does not shift the lens during exposure by more than 1 pixel, 2 pixels or 5 pixels.

Processing Stage: This Stage Includes Three Steps:

a) Frame stack alignment (FIG. 4, step 404): continuing the example in step 402, the N (e.g. 5) frames are aligned according to a certain region of interest (ROI). Alignment may be performed using several methods. According to one example, a known frame alignment procedure such as image registration can be used. According to a second example, frames may be aligned by calculating the expected image shift resulted from known lens or prism shift. According to a third example, data from an inertial measurement system (e.g. a gyroscope accelerometer) may be used to calculate image shift caused by camera handshakes. Lastly, a combination of some or all the alignments above may be used. The ROI may be the same ROI that was used to determine the focus of the camera, may be an ROI indicated by a user via a user-interface, or may be chosen automatically, by detecting the position of an object of interest (for example, a face, detected by known face-detection methods) in the image and by choosing the ROI to include that object of interest. The alignment may compensate for image shifts. The alignment may also include distortion correction that can be introduced by the shifting of the aperture. The alignment may include shifting the images, or may include cropping the images around some point, which may not be the center point of the image. After the alignment, all objects positioned in the same focus plane that corresponds to the object in the chosen ROI are aligned between the frames. Objects at distances outside that plane are misaligned.

b) Frame averaging—(FIG. 4, step 406) the frames are averaged together, using for example a known procedure. In this averaging process, pixels that belong to aligned objects will not suffer any blur in the averaging (i.e. the resulting object in the output image will look the same as in any of the captured images, only with better SNR (approximately increased by a factor IN, where N is the number of averaged images), while pixels that belong to misaligned objects will be averaged with misaligned pixels and will therefore suffer blurring and will appear blurred in the output image. The blurring of object outside the focus plane will result in a shallower DOF, resulting DOF may be shallower by 10%, 20% or 50% than the original DOF (of a single frame). The same effect occurs optically when the lens has a much larger aperture—the object that is in the focus plane (i.e. in the depth position where the lens is focused at) is sharp, and objects in out-of-focus planes (i.e. outside the depth position where the lens is focused at) are blurry. Therefore, the proposed system synthetically enlarges the aperture. According to some example the system may discard some of the N frames, such that discarded frames are not included in the averaging. Discarding frames can be done for example due to blurry images, mis-focus of ROI, etc.

c) Post processing (FIG. 4, step 408): extra stages of processing such as refinement of the blur, adding additional blur, sharpening, etc., may be applied on the synthetically-increased-camera-aperture output image, using for example a known procedure. The output of the camera may include one or all of the original N frames in addition to the synthetically-increased-camera-aperture output image.

Processing steps 404-408 may be performed immediately after frame acquisition step 402, or at later time. Processing steps 404-408 may be done in the host device (e.g. in the host CPU, GPU etc.), or outside the host device (e.g. by cloud computing).

The added blur for objects outside the chosen plane of focus (defined by the object in the chosen ROI) will result in a shallow DOF effect in the output image, compared with any of the images in the stack (the input image to the algorithm). On the focused objects, the averaging of frames will result in better signal to noise ratio compared with any of the images in the stack.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method, comprising: in a camera that includes a camera aperture, an image sensor and an actuator,
operating the actuator to move the camera aperture relative to the image sensor to a plurality of different aperture positions;
capturing a plurality of images, wherein each image of the plurality of images is captured at a respective different camera aperture position; and
processing the plurality of images into a single image that exhibits a shallow depth of focus effect.

2. The method of claim 1, wherein the actuator is an optical image stabilization (OIS) actuator.

3. The method of claim 1, wherein each image capture includes a respective camera exposure synchronized with a respective camera aperture movement.

4. The method of claim 1, wherein the actuator is a closed-loop actuator and wherein the method further comprises providing an aperture position and a settling indication.

5. The method of claim 1, wherein the capturing of each of the plurality of images includes performing a sequence of frame exposure, movement of the actuator to a new position and actuator settling.

6. The method of claim 1, wherein the camera is a folded camera.

7. The method of claim 2, wherein the camera is a non-folded camera.

8. The method of claim 2, wherein the OIS actuator as an extended actuation range.

9. The method of claim 8, wherein the extended actuation range includes a range of up to ±2 mm.

10. The method of claim 9, wherein the extended actuation range is between ±1-2 mm.

11. A camera, comprising:
a camera aperture;
an image sensor; and
an actuator operative to move the camera aperture relative to the image sensor to a plurality of different aperture positions,
wherein the camera is operative to capture a plurality of images, wherein each image of the plurality of images is captured at a respective different aperture position, and to process the plurality of images into a single image that exhibits a shallow depth of focus effect.

12. The camera of claim 1, wherein the actuator is an optical image stabilization (OIS) actuator.

13. The camera of claim 11, wherein the actuator is a closed-loop actuator and wherein the method further comprises providing an aperture position and a settling indication.

14. The camera of claim 11, wherein the camera is a folded camera.

15. The camera of claim 11, wherein the camera is a non-folded camera.

16. The camera of claim 12, wherein the OIS actuator has an extended actuation range.

17. The method of claim 16, wherein the extended actuation range includes a range of up to ±2 mm.

18. The method of claim 17, wherein the extended actuation range is between ±1-2 mm.

* * * * *